US012790981B1

United States Patent
(12) United States Patent
Ward

(10) Patent No.: US 12,790,981 B1
(45) Date of Patent: Nov. 10, 2026

(54) VARIABLE LENGTH ANTI-VORTEX TUBES

(71) Applicant: RTX Corporation, Farmington, CT (US)

(72) Inventor: Thomas W. Ward, Manchester, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 19/335,968

(22) Filed: Sep. 22, 2025

(51) Int. Cl.
*F02C 7/14* (2006.01)
*F01D 5/08* (2006.01)
*F02C 7/141* (2006.01)
*F02C 7/18* (2006.01)
*F04D 29/58* (2006.01)

(52) U.S. Cl.
CPC ................ *F02C 7/18* (2013.01); *F01D 5/087* (2013.01); *F02C 7/141* (2013.01); *F04D 29/582* (2013.01); *F05D 2260/209* (2013.01); *F05D 2260/232* (2013.01)

(58) Field of Classification Search
CPC .. F02C 7/18; F02C 7/141; F01D 5/087; F05D 2260/232; F05D 2260/209
See application file for complete search history.

(56) References Cited

U.S. PATENT DOCUMENTS 6,648,592 B2 11/2003 Escure et al.
7,086,830 B2 * 8/2006 Fitzgerald ............. F04D 29/321 415/115
7,159,402 B2 * 1/2007 Hein ........................ F01D 5/081 60/785
7,552,590 B2 * 6/2009 Drevs ................... F04D 29/584 60/785
8,250,870 B2 * 8/2012 Hein ..................... F04D 29/321 60/785
8,465,252 B2 * 6/2013 Bintz ...................... F01D 25/12 415/115
10,030,517 B2 * 7/2018 Corcoran ................ F01D 25/00
10,577,966 B2 3/2020 Subramanian et al.
10,598,096 B2 * 3/2020 Hugon ....................... F01D 5/08
10,767,485 B2 9/2020 Bintz et al.
(Continued)

FOREIGN PATENT DOCUMENTS

CN 114838000 A * 8/2022 ........... F04D 29/582

*Primary Examiner* — Nathaniel E Wiehe
*Assistant Examiner* — Theodore C Ribadeneyra
(74) *Attorney, Agent, or Firm* — Bachman & LaPointe, P.C.

(57) ABSTRACT

An anti-vortex tube assembly for a compressor includes a first tube fixed to a rotating component of the compressor and extending radially from the rotating component; a second tube slidably mounted relative to the first tube and slidable relative to the first tube between a first radial position defining a first combined length of the first tube and the second tube, and a second radial position defining a second combined length of the first tube and the second tube, wherein the second combined length is different from the first combined length; and a bias member mounted between the first tube and the second tube and biasing the second tube toward one of the first and the second radial position, wherein rotation of the rotating component causes centrifugal force to act on the second tube and exert a force on the second tube against the bias member toward the other of the first and second radial position.

20 Claims, 4 Drawing Sheets

(56) References Cited

U.S. PATENT DOCUMENTS

| | | | | |
|---|---|---|---|---|
| 12,523,178 | B1 * | 1/2026 | Guijarro Valencia .... | F02C 9/18 |
| 2007/0053770 | A1 * | 3/2007 | Lammas ................. | F01D 5/081 |
| | | | | 415/115 |
| 2017/0002850 | A1 * | 1/2017 | Lai .......................... | F16B 7/105 |

* cited by examiner

VARIABLE LENGTH ANTI-VORTEX TUBES

FIELD

The present disclosure relates to anti-vortex tubes and, more particularly, to anti-vortex tubes that are well-suited for operating at different power settings or speeds.

BACKGROUND

Anti-vortex tubes (AVT's) are used in compressors to deliver cooling air to the turbine module. The AVT's are installed inside the compressor rotor and have the roles of keeping air rotation within the compressor from overtaking the speed of the compressor rotor, and also provide compressor bleed air to the high and/or low turbine rotors, which can be useful for cooling and other purposes.

The pressure ratio of the compressor-to-turbine flow system varies with engine pressure ratio. This relationship is not necessarily linear. An AVT system that is designed to meet flow requirements at high-power conditions may not meet requirements at low power operating conditions, due to the lower system pressure ratio from the compressor to the turbine. In this regard, radially longer AVT's provide more flow at lower system pressure ratios. However, these longer tubes can produce more flow than required at high power. Thus, it is problematic to provide AVT's that are as effective as desired in low and high pressure or power operation.

SUMMARY OF THE DISCLOSURE

In one non-limiting embodiment, an anti-vortex tube assembly for a compressor comprises a first tube fixed to a rotating component of the compressor and extending radially from the rotating component; a second tube slidably mounted relative to the first tube and slidable relative to the first tube between a first radial position defining a first combined length of the first tube and the second tube, and a second radial position defining a second combined length of the first tube and the second tube, wherein the second combined length is different from the first combined length; and a bias member mounted between the first tube and the second tube and biasing the second tube toward one of the first and the second radial position, wherein rotation of the rotating component causes centrifugal force to act on the second tube and exert a force on the second tube against the bias member toward the other of the first and second radial position.

In one non-limiting configuration, the assembly further comprises stops positioned between the first tube and the second tube to prevent movement of the second tube relative to the first tube past the first and the second radial position.

In another non-limiting configuration, the bias member comprises a spring positioned within the first tube and compressed between the rotating component and the second tube.

In still another non-limiting configuration, the rotating component comprises a spacer positioned between disks of the compressor.

In a further non-limiting configuration, the first tube and the second tube define a flow path from the compressor to a different component of a gas turbine engine.

In a still further non-limiting configuration, the different component of the gas turbine engine is a high or low turbine rotor of the gas turbine engine.

In another non-limiting configuration, one of the first tube and the second tube slidably fits within the other of the first tube and the second tube to allow telescoping sliding motion of the second tube relative to the first tube.

In still another non-limiting configuration, the bias member has a bias force sufficient to bias the second tube to one of the first and the second radial position at a relatively slow rotating speed, and wherein the bias force is overcome by centrifugal force at a relatively fast rotating speed such that the second tube moves toward the other of the first and the second position.

In a further non-limiting configuration, the first tube extends radially inwardly from the rotating component, and wherein the second tube extends radially inwardly from the first tube.

In a still further non-limiting configuration, the bias member biases the second tube relative to the first tube to a maximum radially inwardly extending position, and wherein the centrifugal force of the rotation exerts a force on the second tube against the bias member toward a minimal radially inwardly extending position.

In another non-limiting configuration, the first tube extends radially outwardly from the rotating component, and wherein the second tube extends radially inwardly from within the first tube and through the rotating component.

In another non-limiting embodiment, a method for operating a variable-length anti-vortex tube in a compressor of a gas turbine engine comprises rotating a rotating component of the compressor at a first rotation speed, wherein the variable-length anti-vortex tube comprises a first tube fixed to the rotating component and extending radially from the rotating component, a second tube slidably mounted relative to the first tube and slidable relative to the first tube between a first position defining a first combined length of the first tube and the second tube, and a second position defining a second combined length of the first tube and the second tube different from the first combined length, and a bias member mounted between the first tube and the second tube and biasing the second tube toward the first position, and wherein the first rotating speed does not generate a sufficient centrifugal force to overcome a strength of the bias member; and rotating the rotating component at a second rotation speed that is faster than the first rotation speed, wherein the second rotation speed causes centrifugal force to act on the second tube and exert a force on the second tube to overcome the strength of the bias member and move the second tube toward the second position.

In one non-limiting configuration, the anti-vortex tube is connected from the compressor to at least one of a high and a low turbine rotor.

In another non-limiting configuration, the strength of the bias member is balanced to keep a pressure ratio between the compressor and the at least one of the high and the low turbine rotor sufficient to keep flow in a direction from the compressor to the at least one of the high and the low turbine rotor.

In another non-limiting embodiment, a gas turbine engine comprises a compressor having a rotating component; at least one high or low turbine rotor upstream or downstream of the compressor; and an anti-vortex assembly comprising a first tube fixed to a rotating component of the compressor and extending radially from the rotating component; a second tube slidably mounted relative to the first tube and slidable relative to the first tube between a first radial position defining a first combined length of the first tube and the second tube, and a second radial position defining a second combined length of the first tube and the second tube, wherein the second combined length is different from the first combined length; and a bias member mounted between the first tube and the second tube and biasing the second tube toward one of the first and the second radial position, wherein rotation of the rotating component causes centrifugal force to act on the second tube and exert a force on the second tube against the bias member toward the other of the first and second radial position; and a cooling flow passage defined from the compressor, through the anti-vortex tube assembly and to the at least one high or low turbine rotor.

In one non-limiting configuration, the gas turbine engine further comprising stops positioned between the first tube and the second tube to prevent movement of the second tube relative to the first tube past the first position and the second position.

In another non-limiting configuration, the bias member comprises a spring positioned within the first tube and compressed between the rotating component and the second tube.

In still another non-limiting configuration, the rotating component comprises a spacer positioned between disks of the compressor.

In a further non-limiting configuration, the first tube has an inner diameter and wherein the second tube has an outer diameter sized to allow telescoping sliding motion of the second tube relative to the first tube.

In a still further non-limiting configuration, the bias member has a bias force sufficient to bias the second tube to the first position at a relatively slow rotating speed, and wherein the bias force is overcome by centrifugal force at a relatively fast rotating speed such that the second tube moves toward the second position.

The foregoing features and elements may be combined in various combinations without exclusivity, unless expressly indicated otherwise. These features and elements, as well as the operation thereof, will become more apparent in light of the following description and the accompanying drawings. It should be appreciated that the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination. Additionally, any reference to without contact (or similar phrases) may also include reduced contact or minimal contact. It should also be understood that unless specifically stated otherwise, references to “a”, “an”, or “the” may include one or more than one and that reference to an item in the singular may also include the item in the plural. Further, all ranges may include upper and lower values and all ranges and ratio limits disclosed herein may be combined.

The present disclosure relates compressors which can for example be a component of a gas turbine engine. Such compressors frequently have tubes referred to herein as anti-vortex tubes or AVTs which are also used to deliver bleed air to other components, and also are used to capture flow of air at a location that minimizes the possibility of vortex flow of air in the compressor that can exceed rotation speed of the rotor disks. As disclosed herein, AVTs are disclosed which are variable in length which provides for desirable operation at different power or rotation speeds of the compressor as will be discussed below.

Figure 1:
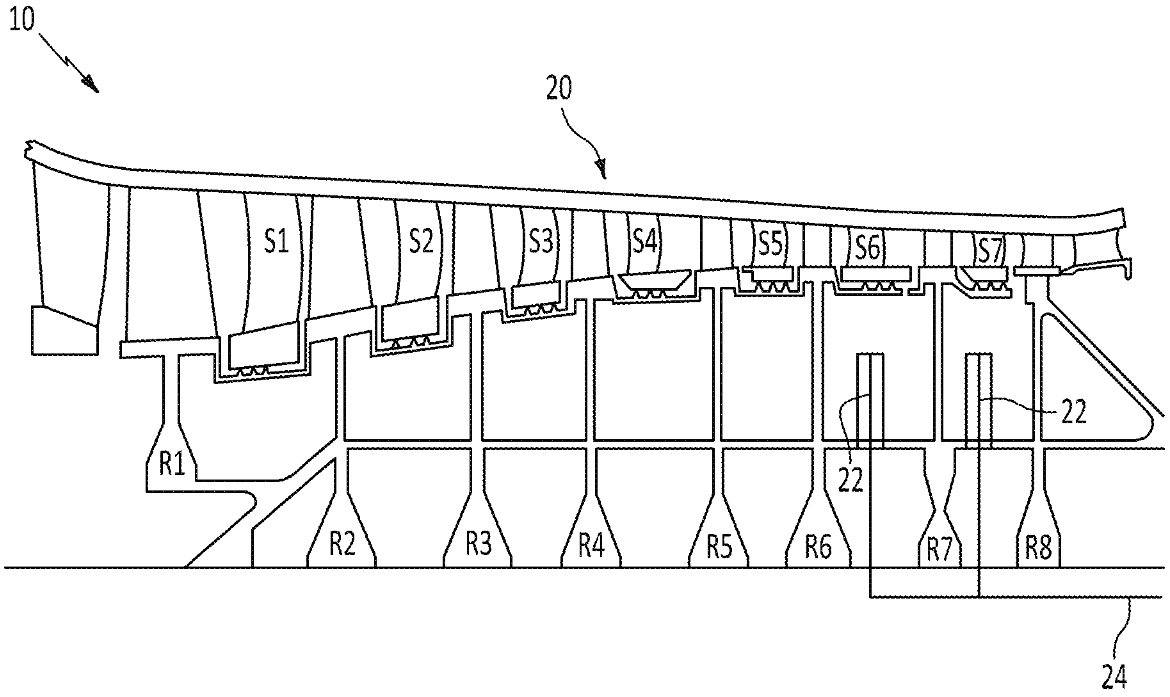
FIG. 1 illustrates a portion of a compressor of a gas turbine engine including anti-vortex tubes.

FIG. 1 shows a portion of a gas turbine engine 10, specifically a portion of a compressor section 20 of gas turbine engine 10. As shown, compressor 20 typically has a plurality of compressor disks or rotors shown at R1-R8. AVTs are shown at 22 in spaces between adjacent disks, in this case between R6 and R7, and also between R7 and R8. AVTs 22 capture flow from within compressor 20 and bleed this air off to other components in gas turbine engine 10. This bleed flow is schematically represented in FIG. 1 at line 24, which can flow to, for example, a high or low turbine rotor.

One issue encountered with AVTs such as those illustrated is that it can be challenging to maintain desired flow conditions, which are caused by the pressure ratio between compressor and turbine, as the pressure ratio changes at different operating conditions of the gas turbine engine. Length of the AVT in the compressor controls flow rate through the AVT to the downstream components. It has been found that longer AVTs are desirable for operating at low power conditions as they keep flow at a high rate and prevent flow reversal which can damage components in the overall system. However, at higher power operation, the longer AVT can result in excessive flow to the downstream component with losses in efficiency and other undesirable outcomes.

Figure 2:
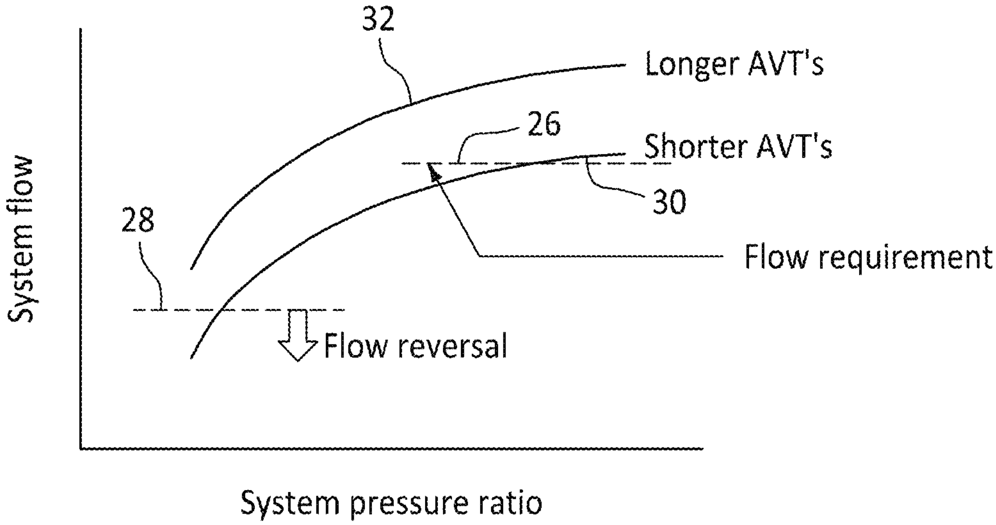
FIG. 2 illustrates relationship between system flow and system pressure ratio for flow through a relatively longer and a relatively shorter AVT.

FIG. 2 graphically illustrates this issue, and shows relationship between system pressure ratio and system flow for different length AVTs. Desired flow rate is shown at line 26, and undesirable reverse flow rate is shown at line 28. As can be seen, if a shorter AVT is selected, as shown at curve 30, operation may be ideal at higher system pressure ratios. However, at lower system pressure ratios, the curve drops below the flow reversal line 28 which is undesirable. On the other hand, with a longer AVT as represented by curve 32, while the flow remains above flow reversal line 28 even at lower system pressure ratios, at the higher normal operating pressure ratios, the flow is significantly higher than the flow requirement 26.

Figure 3:
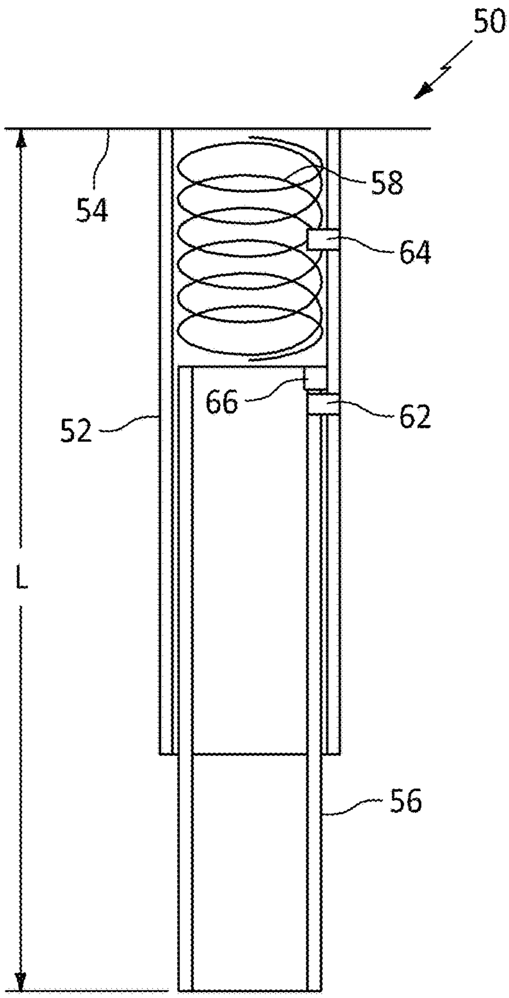
FIG. 3 illustrates a variable length anti-vortex tube as disclosed herein in a low power operating position.
Figure 4:
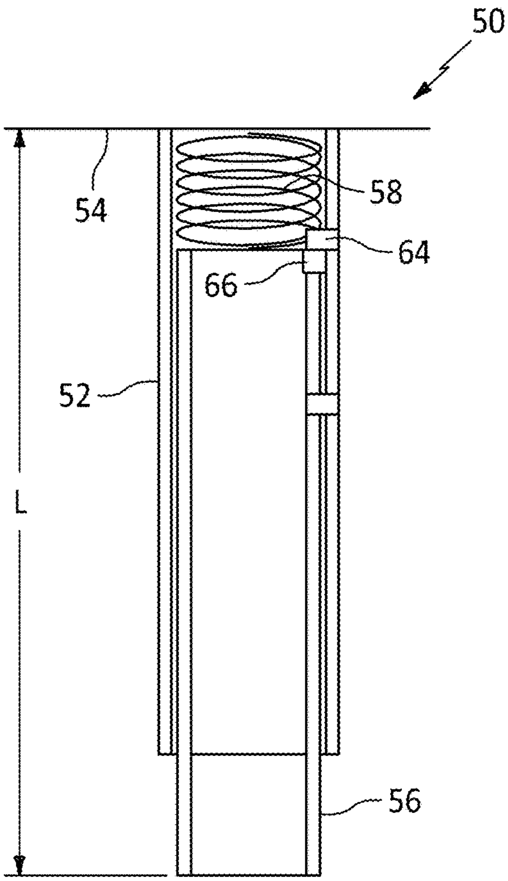
FIG. 4 illustrates the variable length anti-vortex tube of FIG. 3 in a high power operating position.

FIGS. 3 and 4 illustrate one non-limiting embodiment of a variable length anti-vortex tube (AVT) 50. In this configuration, AVT 50 can have a first tube portion 52 which can be fixed or mounted to a rotating component of compressor 20, in this case a spacer 54 which can be positioned between two adjacent disks or rotors. A second tube portion 56 can be slidably positioned within or relative to first tube portion 52, and a bias member 58 can be positioned to bias second tube portion 56 relative to first tube portion 52.

In the illustrated configuration, second tube portion 56 is sized to slide inside of first tube portion 52. That is, first tube portion 52 has an inner diameter that is sized to receive an outer diameter of second tube portion 56. This allows second tube portion 56 to move relative to first tube portion 52 for example between the two positions illustrated in FIGS. 3 and 4.

Figure 5:
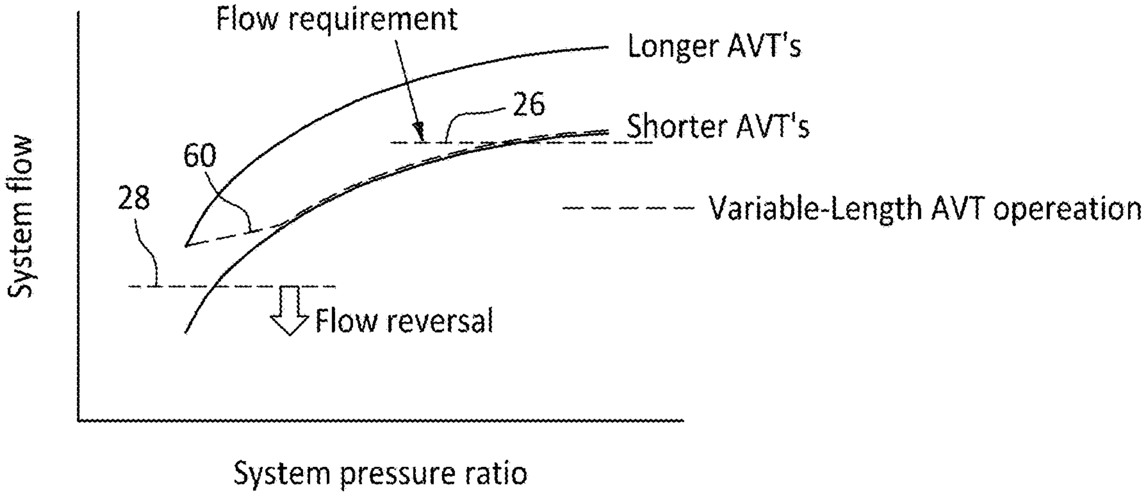
FIG. 5 illustrates the system flow and system pressure ratio relationship of FIG. 2 with a curve representing operation of a variable length AVT.

In the position illustrated in FIG. 3, AVT 50 has a relatively longer combined length (of first tube portion 52 and second tube portion 56) which is well L suited to maintaining desired flow at lower power operating conditions, and thus the flow line at this length would approximate the flow curve 32 of FIG. 2. The shorter relative combined length of AVT in the position of FIG. 4 would more closely approximate the flow curve 30 of FIG. 2. Due to bias member 58, however, AVT 50 is adjustable between these positions based upon the operating power and resulting rotational speed of the compressor and rotating component 54. Specifically, at relatively low rotational speeds, biasing member 58, in this case a spring, has sufficient spring strength to push second tube portion 56 to the position shown in FIG. 3. As rotation speed increases, however, the perceived centrifugal force exerted upon second tube portion 56 can begin to overcome the bias strength of biasing member 58 until second tube portion 56 moves toward rotating component 54 resulting in a shorter overall length of the combination of first tube portion 52 and second tube portion 56 as shown in FIG. 4. Thus, with the illustrated configuration, AVT 50 adjusts in length to a shorter length as rotational speed increases, which desirably moves the operation curve from the relation of curve 32 in FIG. 2 toward the relation of curve 30. FIG. 5 shows this transition at curve 60 which represents operation of a variable length AVT as disclosed herein. As can be seen, flow reversal (line 28) is avoided at lower system pressure ratios due to the longer combined length of AVT 50 at this rotation speed, and at higher system pressure ratios, flow is maintained at or slightly above the desired flow (line 26) due to a relatively shorter combined length of AVT 50 at the higher rotation speed.

Returning to FIGS. 3 and 4, AVT 50 may include stops 62, 64 which can interact with a structure 66 of second tube portion 56 to define maximum and minimum length positions of second tube portion 56 relative to first tube portion 52. Thus, stop 62 serves to prevent further radially inward movement of second tube portion 56 relative to first tube portion 52 from the position as shown in FIG. 3, while stop 64 prevents further radially outward movement of second tube portion 56 relative to first tube portion 52 beyond the position shown in FIG. 4.

AVT 50 can be produced from any suitable materials having desired ability to withstand conditions within the compressor, and to provide for reliable sliding movement of one tube portion relative to the other. It should be appreciated that the interacting surfaces of tube portions 52, 56 can be subjected to considerable fretting and/or other friction related wear, and therefore it may be desired to treat the interacting surfaces with coatings or other treatments to reduce wear due to these conditions.

It should be appreciated that while FIGS. 3 and 4 are not necessarily drawn to scale, they are reliably to scale sufficiently for the intended presentation of different overall length L of combined tube portions 52, 56 in each position or configuration.

While the present non-limiting disclosure is made in terms of a spring serving as the bias member, this function could be provided using other structures such as pneumatics, magnetics, electromagnetics and the like. In addition, while second tube portion 56 is shown mounted inside of first tube portion 52, with spring 58 mounted inside of first portion 52, other configurations are also possible to allow for a telescoping movement of one portion relative to the other to allow the adjustment of overall length of the tube. As non-limiting further examples, first portion 52 could be slidable within second portion 56, spring 58 could be mounted outside of first portion 52 rather than inside, and the like.

As will be appreciated from the above description, in operation, AVT 50 will be in the position shown in FIG. 3, with the combined overall length of first and second tube portions 52, 56 at the longer length. This length is well-suited to low power or speed operation of the compressor. As appropriate either during initial powering up of the gas turbine engine or for other reasons, as the power and rotation speed are increased, centrifugal force acting on second tube portion 56 increases until it overcomes the force of spring 58. At this point, further increases in speed gradually move second portion 56 toward the position of FIG. 4, with a shorter combined length of tube portions 52, 56, which is better suited to proper function at the higher power and rotation speeds which bring about the change in length. Thus, the adjustable length anti-vortex tube 50 as disclosed herein is automatically adjusted in length by rotational speed, which causes the length to adjust to the optimal length for the particular rotational speed, thus keeping flow above the reverse flow level 28 and at or around the desired flow requirement 26, see FIG. 5.

Figure 6:
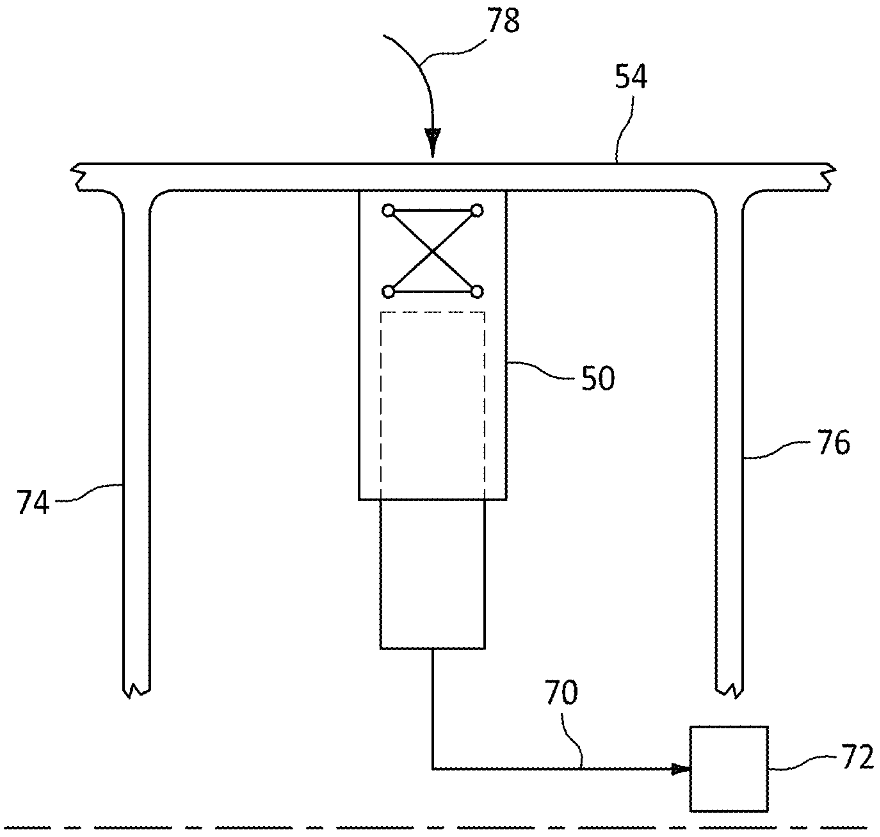
FIG. 6 schematically illustrates an AVT system in a gas turbine engine environment.

Referring to FIG. 6, an overall system incorporating an AVT 50 as disclose herein is further schematically illustrated. As shown, anti-vortex tube 50 can be connected to rotating structure such as spacer 54 and communicated to a flow line 70 to other components 72 of gas turbine engine. In FIG. 6, components 72 can be considered to schematically represent high or low turbines or other components to which bleed air can advantageously be fed. FIG. 6 further schematically illustrated disks 74, 76 between which tube 50 can be mounted. Flow into tube 50 is represented schematically by arrow 78, which can be defined with apertures or other flow passages through spacer 54 as is known in the art, and this flow is kept at desired levels by the adjustment in length of tube 50 as discussed herein.

Figure 7:
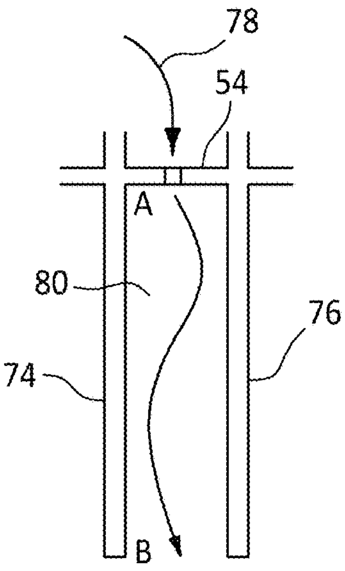
FIGS. 7-9 illustrate flow without an anti-vortex tube, and with a relatively short and long anti-vortex tube respectively.
Figure 8:
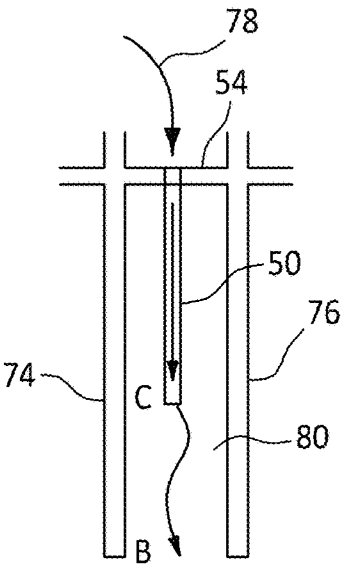
Figure 9:
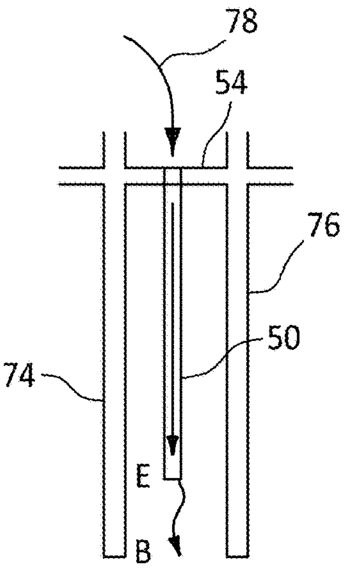

The effect of anti-vortex tubes generally and of different length is further explained in FIGS. 7-9. FIG. 7 shows a flow space without an ATV and show flow passes through spacer 54 and flows the entire distance to the inner diameter where the flow is captured and fed to other components as discussed above. Thus, the distance that this flow is allowed to vortex is the entire distance from point A to point B in FIG. 7. This can result in the flow conditions for which anti-vortex tubes are desired, to prevent excessive problematic vortex flow through spaces such as space 80. In FIG. 8, a relatively shorter AVT 50 is disposed in space 80 and receives flow through spacer 54. This results in the flow being free to vortex from where it exits AVT 50, from point C to point D which represents the inner diameter where the flow is captured for feed to other components. As can be appreciated, this results in a shorter vortex flow, from point C to point D, as compared to FIG. 7 without an AVT 50. Finally, FIG. 9 shows flow conditions with a relatively longer AVT 50, wherein flow exits AVT 50 at point E and is free to vortex to the inner diameter or point where the flow is captured for flow to other components, at point F. It will be appreciated that the free vortex flow distance is shorter with a relatively longer AVT (FIG. 9) as compared to a relatively shorter AVT (FIG. 8). It will also be appreciated that the different length AVTs 50 as shown in FIG. 8 and FIG. 9 can be accomplished in operation with the same AVT through the adjustable length AVT as disclosed herein, which advantageously adjusts flow conditions within space 80 based upon rotating speed of the rotating components of the compressor.

Figure 10:
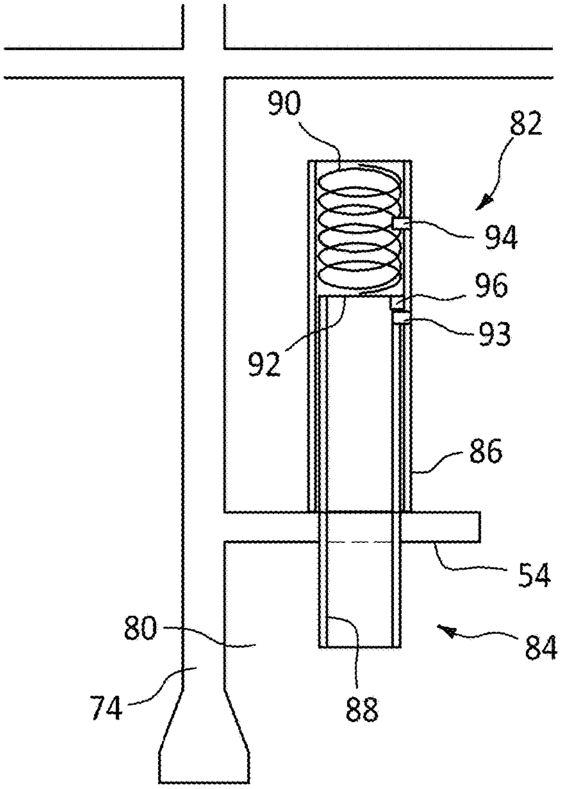
FIGS. 10 and 11 illustrate different radially extending positions with another non-limiting embodiment.
Figure 11:
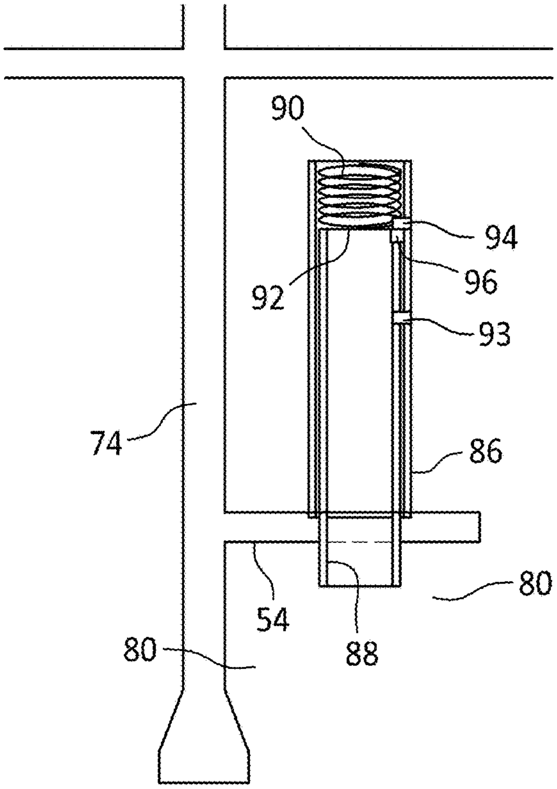

As shown in FIG. 1, in some instances anti-vortex tubes extend both radially outwardly and radially inwardly from rotating structures such as the spacer between disks, and FIGS. 10 and 11 illustrate another embodiment of adjustable length AVT in connection with such an embodiment. As shown in FIG. 10, AVT 50 has portions that extend radially outwardly (portion 82) and radially inwardly (portion 84) from spacer 54 in similar manner to the schematic representation in FIG. 1. It is desired in this configuration to provide for adjustable length of the radially inwardly extending portion 84. This is accomplished in this non-limiting configuration by having first tube 86 mounted to spacer and extending radially outwardly from spacer 54 as shown. A second tube 88 can be slidably mounted relative to first tube 86, and extending radially inwardly from first tube 86 and through spacer 54 to define radially inwardly extending portion 82. A bias member 90 can be positioned between an end 92 of second tube 88 and a fixed location on first tube 86, and serves to bias second tube 88 radially inwardly relative to first tube 86. Thus, bias member 90 such as a spring or alternative structure serves to bias the AVT of FIG. 10 to a maximum inwardly extending position which is well-suited to lower rotation speeds as with the embodiment discussed above. FIG. 11 shows the same structure when rotating at relatively higher speeds which are sufficient to generate centrifugal force radially outwardly on second tube 88 to compress spring member 90 and move second tube 88 to the position of FIG. 11 which presents an overall shorter length of AVT within space 80. This is well suited to rotation at higher speeds where it is tolerable to have a longer distance of vortex flow (as in FIG. 8).

In the embodiment of FIGS. 10 and 11, stops 93, 94 can be positioned on tube 88 and another stop 96 on tube 90, wherein stop 96 can move between stops 93, 94 so as to limit the extent of movement of tube 90 relative to tube 88 and thereby define the longest combined length as shown in FIG. 10 and the shortest combined length as shown in FIG. 11. It should be noted that the length referred to as combined length in each of FIGS. 10 and 11 is actually only the portion of second tube 88 that extends radially inwardly from spacer 54, this is nonetheless referred to as combined length as with the first described embodiment due to the interaction with first tube 86 and spring 90 that leads to the length of second tub 88 extending inwardly from spacer 54 as described.

The foregoing description is exemplary of the subject matter disclosed herein. Various non-limiting embodiments are disclosed, however, one of ordinary skill in the art would recognize that various modifications and variations in light of the above teachings will fall within the scope of the appended claims. It is therefore to be appreciated that within the scope of the appended claims, the disclosure may be practiced other than as specifically described. Thus, the scope of the present claims is not specifically limited by the details of specific embodiment disclosed herein, but rather the claims define the full and reasonable scope of the disclosure.

I claim:

1. An anti-vortex tube assembly for a compressor, comprising:

a first tube fixed to a rotating component of the compressor and extending radially from the rotating component;

a second tube slidably mounted relative to the first tube and slidable relative to the first tube between a first radial position defining a first combined length of the first tube and the second tube, and a second radial position defining a second combined length of the first tube and the second tube, wherein the second combined length is different from the first combined length; and a bias member mounted between the first tube and the second tube and biasing the second tube toward one of the first and the second radial position, wherein rotation of the rotating component causes centrifugal force to act on the second tube and exert a force on the second tube against the bias member toward the other of the first and second radial position.

2. The assembly of claim 1, further comprising stops positioned between the first tube and the second tube to prevent movement of the second tube relative to the first tube past the first and the second radial position.

3. The assembly of claim 1, wherein the bias member comprises a spring positioned within the first tube and compressed between the rotating component and the second tube.

4. The assembly of claim 1, wherein the rotating component comprises a spacer positioned between disks of the compressor.

5. The assembly of claim 1, wherein the first tube and the second tube define a flow path from the compressor to a different component of a gas turbine engine.

6. The assembly of claim 5, wherein the different component of the gas turbine engine is a high or low turbine rotor of the gas turbine engine.

7. The assembly of claim 1, wherein one of the first tube and the second tube slidably fits within the other of the first tube and the second tube to allow telescoping sliding motion of the second tube relative to the first tube.

8. The assembly of claim 1, wherein the bias member has a bias force sufficient to bias the second tube to one of the first and the second radial position at a relatively slow rotating speed, and wherein the bias force is overcome by centrifugal force at a relatively fast rotating speed such that the second tube moves toward the other of the first and the second position.

9. The assembly of claim 1, wherein the first tube extends radially inwardly from the rotating component, and wherein the second tube extends radially inwardly from the first tube.

10. The assembly of claim 9, wherein the bias member biases the second tube relative to the first tube to a maximum radially inwardly extending position, and wherein the centrifugal force of the rotation exerts a force on the second tube against the bias member toward a minimal radially inwardly extending position.

11. The assembly of claim 1, wherein the first tube extends radially outwardly from the rotating component, and wherein the second tube extends radially inwardly from within the first tube and through the rotating component.

12. A method for operating a variable-length anti-vortex tube in a compressor of a gas turbine engine, comprising:

rotating a rotating component of the compressor at a first rotation speed, wherein the variable-length anti-vortex tube comprises a first tube fixed to the rotating component and extending radially from the rotating component, a second tube slidably mounted relative to the first tube and slidable relative to the first tube between a first position defining a first combined length of the first tube and the second tube, and a second position defining a second combined length of the first tube and the second tube different from the first combined length, and a bias member mounted between the first tube and the second tube and biasing the second tube toward the first position, and wherein the first rotating speed does not generate a sufficient centrifugal force to overcome a strength of the bias member; and rotating the rotating component at a second rotation speed that is faster than the first rotation speed, wherein the second rotation speed causes centrifugal force to act on the second tube and exert a force on the second tube to overcome the strength of the bias member and move the second tube toward the second position.

13. The method of claim 12, wherein the anti-vortex tube is connected from the compressor to at least one of a high and a low turbine rotor.

14. The method of claim 12, wherein the strength of the bias member is balanced to keep a pressure ratio between the compressor and the at least one of the high and the low turbine rotor sufficient to keep flow in a direction from the compressor to the at least one of the high and the low turbine rotor.

15. A gas turbine engine, comprising:

a compressor having a rotating component;

at least one high or low turbine rotor upstream or downstream of the compressor; and an anti-vortex assembly comprising a first tube fixed to a rotating component of the compressor and extending radially from the rotating component; a second tube slidably mounted relative to the first tube and slidable relative to the first tube between a first radial position defining a first combined length of the first tube and the second tube, and a second radial position defining a second combined length of the first tube and the second tube, wherein the second combined length is different from the first combined length; and a bias member mounted between the first tube and the second tube and biasing the second tube toward one of the first and the second radial position, wherein rotation of the rotating component causes centrifugal force to act on the second tube and exert a force on the second tube against the bias member toward the other of the first and second radial position; and a cooling flow passage defined from the compressor, through the anti-vortex tube assembly and to the at least one high or low turbine rotor.

16. The gas turbine engine of claim 15, further comprising stops positioned between the first tube and the second tube to prevent movement of the second tube relative to the first tube past the first position and the second position.

17. The gas turbine engine of claim 15, wherein the bias member comprises a spring positioned within the first tube and compressed between the rotating component and the second tube.

18. The gas turbine engine of claim 15, wherein the rotating component comprises a spacer positioned between disks of the compressor.

19. The gas turbine engine of claim 15, wherein the first tube has an inner diameter and wherein the second tube has an outer diameter sized to allow telescoping sliding motion of the second tube relative to the first tube.

20. The gas turbine engine of claim 15, wherein the bias member has a bias force sufficient to bias the second tube to the first position at a relatively slow rotating speed, and wherein the bias force is overcome by centrifugal force at a relatively fast rotating speed such that the second tube moves toward the second position.

* * * * *